United States Patent Office 3,737,440
Patented June 5, 1973

3,737,440
POLYGLYCOLIC ACID IN SOLUTIONS
Edward E. Schmitt, Norwalk, Conn., and William J. Bailey, Hyattsville, Md., assignors to American Cyanamid Company, Stamford, Conn.
No Drawing. Continuation-in-part of application Ser. No. 34,593, May 4, 1970. This application Aug. 12, 1971, Ser. No. 171,320
Int. Cl. C08g 51/34
U.S. Cl. 260—32.8 R
2 Claims

ABSTRACT OF THE DISCLOSURE

Hexafluoroisopropyl alcohol and hexafluoroacetone sesquihydrate are disclosed as unique solvents for preparing solutions of polyglycolic acid. Such solutions are useful as spinning dopes for wet or dry spinning of polyglycolic acid, for preparing cast films of polyglycolic acid, and for performing a variety of analytical procedures on polyglycolic acid which require the polymer to be in solution.

CROSS REFERENCE TO RELATED APPLICATION

This application is a continuation-in-part of our earlier application, Ser. No. 34,593, filed May 4, 1970 entitled "Solutions of Polyglycolic Acid," now abandoned.

BACKGROUND OF THE INVENTION

Polyglycolic acid is a known polymer and has been prepared in the past by a variety of processes known to those skilled in the art. At least two varieties of this polymer have been described in detail in the prior art. The Higgins, U.S. Pat. 2,676,945, shows the high molecular weight polymers melting at about 232–233° C. and capable of being fashioned into useful articles and fibers. In the U.S. Pat. 3,468,853 polyglycolic acid is shown to be truly polymeric when it has a crystalline melting point falling between 230 and 232° C. although others have measured this physical property and reported it to fall between about 222° C. and 235° C.

Bowman, U.S. Pat. 3,047,524, on the other hand, describes a class of oligomeric polymers melting between 90 and 130° C. which are useful in the field of oxidizer binders for solid propellants.

Oligomers are usually defined as the low members of the polymeric-homologous series, with molecular weights up to about 1000–2000. Homologous oligomers due to their low molecular weight differ sufficiently in their physical properties so that they are, in general, far more soluble than their high molecular weight counter-parts. Indeed, we have found this to be true in the case of polyglycolic acid. High molecular weight polyglycolic acid is insoluble in all the common solvents but linear and cyclic oligomers and high molecular weight heterologs of polyble in a variety of common solvents.

These same solvents are also useful in dissolving the oligomers and high molecular weight heterologs of polyglycolic acid but not the high molecular weight polyglycolic acid itself. It seems apparent therefore that the solubility of high molecular weight polyglycolic acid is a singularly unique phenomenon in the field of polymer science. For example, high molecular weight hydroxyacid polymers such as polylactic acid, poly α hydroxy isobutyric acid, polydimethyl ketene, poly α,α-diethyl β-propiolactone, poly ω-hydroxy caproic acid, and poly ω-hydroxy decanoic acid are soluble in one or a number of such common solvents such as chloroform, benzene, chlorobenzene, toluene, tetralin, anisole, cyclohexane, trifluoro acetic acid and a variety of aromatic and halogenated hydrocarbons. The oligomers and the polymers are also soluble in a variety of secondary and tertiary poly-halo alcohols as described by Middleton in U.S. Pat. 3,245,944.

Interest has recently been revived in polyglycolic acid because of the disclosure of U.S. Pat. 3,297,033 that the high molecular weight, common solvent insoluble, polyglycolic acid has been successfully employed to prepare absorbable surgical sutures. These synthetic sutures provide a viable alternative to the so called "catgut" sutures which have been historically used by the medical profession when absorbability in living tissues was required. Several collateral patents relating to polyglycolic acid absorbable sutures have recently appeared, such as, for example, U.S. Pats. 3,457,280, 3,435,008, 3,442,871, 3,442,181, 3,468,853, 3,414,939 and 3,463,158 and each of the aforesaid patents are incorporated herein by reference.

Heretofore, the principal way that polyglycolic acid polymer was fabricated into usable form such as filaments, films, and various other shapes was by the use of melt spinning techniques. Solution techniques could not be used because they required an acceptable solvent for polyglycolic acid, and such solvents were not heretofore available. A wide variety of known polymer solvents had been employed in an attempt to solubilize polyglycolic acid but generally to no avail. The lack of an available acceptable solvent for polyglycolic acid had the effect of preventing the use of wet and dry spinning techniques in the fabrication of shaped polyglycolic acid articles. Of the solvents investigated in the past, several problems have been found to exist. For example, none of the solvents would dissolve the polyglycolic acid. Moreover, certain other solvents investigated had the effect of chemically degrading the polymer or otherwise reacting with the polymer in such a way as to break down the polymer structure. To briefly summarize, all the common solvents heretofore employed had one or more drawbacks which detracted from their use as a solvent for polyglycolic acid.

It is therefore an object of this invention to provide unique solvents for achieving solubility of polyglycolic acid without the attendant disadvantages of previously employed common solvents.

It is another object of this invention to provide solutions of polyglycolic acid which are eminently suitable for the preparation of various shaped forms of polyglycolic acid by various solution techniques such as for example, wet and dry spinning.

SUMMARY OF THE INVENTION

The invention relates to unique solutions of polyglycolic acid. More particularly, it relates to solutions comprising polyglycolic acid dissolved in hexafluoroisopropyl alcohol or in hexafluoroacetone sesquihydrate. The nature of the polyglycolic acid employed in preparing these solutions, except as indicated hereinbelow with respect to the degree of crystallinity, is not critical and it has been found, for example, that polyglycolic acid of widely varying molecular weight above a minimum of several thousand is quite suitable as is polyglycolic acid prepared from a variety of different process routes provided that the melting point in the crystalline state falls within the range of 222° C. and 235° C.

This invention also relates to various processes which make use of the solutions of this invention as a means for producing various shaped articles of polyglycolic acid.

Hexafluoroisopropyl alcohol and hexafluoroacetone sesquihydrate are both known chemicals which are commercially available or can be readily prepared in accordance with known procedures. For example, see the article by Middleton and Lindsey entitled "Hydrogen Bonding in Fluoro Alcohols" in the Journal of the American Chemical Society, vol. 85, pages 4948–4952 inclusive. We have found that when either of these two unique solvents is employed to dissolve polyglycolic acid, a solution of polyglycolic acid is readily prepared which retains solubility of the polyglycolic acid therein over a wide range of temperatures, and wherein substantially no degradation of the polyglycolic acid occurs.

These solutions of polyglycolics acid in either hexafluoroisopropyl alcohol or hexafluoroacetone sesquihydrate are useful as spinning dopes for wet and dry spinning of polyglycolic acid, as a vehicle for preparing cast films of various thicknesses of polyglycolic acid, and when dilute solutions are employed, as a very convenient means for performing a variety of analytical procedures upon polyglycolic acid which require that the polyglycolic acid be in solution.

DESCRIPTION OF THE PREFERRED EMBODIMENTS

The solutions and preparation thereof

As discussed heretofore the nature of the polyglycolic acid used to prepare the solutions is generally of no consequence except for its degree of crystallinity and its melting point in the crystalline state. However, the nature of the polyglycolic acid employed does become important in one respect. If the polyglycolic acid is in a substantially amorphous form, i.e., less than about 10% crystallity, the polyglycolic acid will dissolve quickly and completely in both hexafluoroisopropyl alcohol and in hexafluoroacetone sesquihydrate. Moreover, it has been generally found that if the polyglycolic acid employed possesses a degree of crystallinity which is less than about 30%, solutions of polyglycolic acid in both solvents of this invention can still be readily and conveniently prepared; however, if the degree of crystallinity of the polymer exceeds about 30%, the polyglycolic acid is soluble only in hexafluoroacetone sesquihydrate. If the degree of crystallinity exceeds 75%, the polymer is soluble in neither. As the degree or percentage of crystallinity increases, the solubility of the polyglycolic acid diminishes and reciprocally as the degree of crystallinity diminishes, the solubility of the polyglycolic acid increases. As a consequence, the polyglycolic acid, having a degree of crystallinity between about 0% and 30%, can be dissolved in the hexafluoroisopropyl alcohol in an amount varying between about 0.01% and about 30% by weight of polyglycolic acid based on the total weight of solution. On the other hand, if the polyglycolic acid has a degree of crystallinity varying between about 0% and not more than 75%, the polyglycolic acid can be dissolved in the hexafluoroacetone sesquihydrate in amounts varying between about 0.01% and about 40% by weight of polyglycolic acid based on the total weight of the solution. The insolubility of crystalline polyglycolic acid in the cited solvents, however, can be readily overcome by insuring that the polyglycolic acid employed to prepare the solutions is in the substantially amorphous form. It is a relatively simple procedure to convert highly crystalline polyglycolic acid into the more desirable amorphous form by simply melting highly crystalline polyglycolic acid and thereupon quenching it quickly to assure formation of the amorphous form of the solid polymer. A typical procedure for converting crystalline polyglycolic acid into amorphous polyglycolic acid is shown hereinbelow in Example 5.

The concentration of dissolved polyglycolic acid which exists in the solutions of this invention can vary over wide ranges. However, the rate of solution of polyglycolic acid in the solvent will increase as the temperature of the solvent increases. Generally, higher temperatures and longer contact times can be employed to prepare solutions having higher contents of dissolved polyglycolic acid.

In the case of hexafluoroisopropyl alcohol solutions of polyglycolic acid, it has been found that solutions containing anywhere from about .01% to about 30% by weight polyglycolic acid can be readily prepared. For example, a 30% solution can be prepared at about 65° C. in about 24 hours. More dilute solutions can of course, be prepared in shorter times and at lower temperatures. A 5% to 10% solution for example, can be prepared in about 1 to 2 hours at 40° C. to 50° C.

In the case of hexafluoroacetone sesquihydrate solutions of polyglycolic acid, it has been found that solutions containing from about 0.01% to about 40% polyglycolic acid can be readily prepared. For example, a 40% solution can be prepared at about 65° C. in about 36 hours. Again, more dilute solutions can be prepared in shorter times and at lower temperatures. A 5% to 10% solution, for example, can be prepared in about 1 to 2 hours at 40° C. to 50° C.

Analytical utility of solutions

Very dilute solutions of polyglycolic acid, i.e., in the range of .01% to 1% by weight, find particular utility as a vehicle for analytically measuring various properties of the polymer in accordance with techniques well known to those skilled in the polymer art; for example, viscosity measurements, and the determination of molecular shape and size from light scattering equipment are but a few of these analytical applications. Generally, for most analytical work a concentration of dissolved polymer of from about 0.1% to 0.5% suffices.

Casting of films

The solutions of this invention are also useful as a vehicle for preparing cast films of polyglycolic acid. Such films can be conveniently prepared from solutions containing from about 0.5% to 25% by weight polyglycolic acid. These films are prepared by spreading the solution onto an appropriate surface which will not stick to the formed film and thereupon providing for removal of the solvent to deposit the film of polyglycolic acid upon the surface. If very thin films such as, for example, membranes or films having thicknesses of less than about 0.5 mil are desired, the solutions of this invention can also be carefully deposited upon any suitable liquid which is a solvent for the hexafluoroisopropyl alcohol or hexafluoroacetone sesquihydrate wherein the liquid serves as the surface upon which the solution is deposited and whereupon the liquid will extract the hexafluoroisopropyl alcohol or hexafluoroacetone sesquihydrate leaving deposited upon the liquid surface a very thin film of polyglycolic acid. Suitable solvents for this purpose include ethyl acetate, tertiary amyl alcohol, t-butanol and water.

The concentration of solution employed in preparing cast films will, of course, depend upon the desired thickness of the dried film. Generally, film thicknesses of anywhere from 0.5 mil to about 50 mils, and preferably 0.5 to 20 mils, can be readily prepared from the solutions of this invention. Solutions containing from about 0.5% to 5% polyglycolic acid are preferred for preparing cast films in accordance with the process of this invention. The films thus produced are tough, self-supporting films which when thin are quite clear but which upon standing tend to crystallize and become opaque.

Appropriate non-stick surfaces for preparing polyglycolic acid films include such items as glass, stainless steel, Teflon® and various fluorinated polymers such as, for example, fluorinated ethylene propylene copolymers.

Best results are obtained when the casting solution is maintained at a temperature between about room temperature and about 60° C. and preferably between room temperature and about 50° C.

Wet and dry spinning

The solutions of this invention are eminently suitable for spinning into filaments or thin films using the standard techniques of wet or dry spinning. The term "shaped article of polyglycolic acid" as used herein, means a filament or filaments of polyglycolic acid and thin films of polyglycolic acid, i.e., films having a thickness of 10 mils or less.

In a typical wet spinning operation, a solution or spinning dope of polyglycolic acid dissolved in either hexafluoroisopropyl alcohol or hexafluoroacetone sesquihydrate is prepared and thereupon extruded through an appropriate extrusion orifice at a solution temperature of 40° C. to 80° C., and preferably 60° C. to 80° C., into a suitable liquid coagulating medium such as, for example, ethyl acetate, tertiary amyl alcohol, t-butanol, or water. The coagulating liquid is maintained at a temperature below that of the extrudate, such as, for example, room temperature or below, and as low as about −20° C. The coagulant may be any solvent or system of solvents which coagulates polyglycolic acid and removes the solvent associated therewith in the spinning solution.

It should be noted that although the boiling point of hexafluoroisopropyl alcohol is about 58° C. at atmospheric pressure, the boiling point of solutions of polyglycolic acid in hexafluoroisopropyl alcohol will exceed 58° C. depending upon how much polymer is dissolved in the solvent, and the pressure exerted on the system. Thus solution temperatures and ranges of temperatures such as 40 to 80° C. and similar ranges which appear throughout this specification contemplate the temperatures of solutions containing varying amounts of polyglycolic acid under varying pressures which can elevate the boiling point of the solution into the upper limits of such temperature ranges.

A spinning solution will preferably contain as much polyglycolic acid as can be dissolved in the solution. It has been found in the case of hexafluoroisopropyl alcohol that a solution containing from about 10% to about 30% by weight polyglycolic acid provides an acceptable spinning solution whereas, when hexafluoroacetone sesquihydrate is the solvent, a polyglycolic acid concentration of from about 10% to about 40% can be employed. In general, it is preferred to use as high a concentration of dissolved polyglycolic acid as possible in the spinning dopes. In the case of a hexafluoroisopropyl alcohol spinning dope a polyglycolic acid concentration of 25–30% is preferred whereas a polyglycolic acid concentration of 35–40% is preferred when hexafluoroacetone sesquihydrate spinning dopes are used. The spinning dopes may contain undissolved polyglycolic acid provided the undissolved particles are of sufficiently small size so as to not interfere with the extrusion of the solutions.

As the extrudate contacts the coagulant bath, it coagulates to form a shaped article of polyglycolic acid which is then washed with a solvent such as water, ethyl acetate, or tertiary amyl alcohol to remove residual hexafluoroacetone sesquihydrate or hexafluoroisopropyl alcohol. The shaped article is then stretched in accordance with standard fiber or film making procedures to orient the polyglycolic acid. In the case of a filament of polyglycolic acid, the strand will typically be stretched anywhere from three to seven times its original length. In the case where the shaped article is a thin film of polyglycolic acid, it may be similarly stretched or it may be subjected to a biaxial stretch or from about three to seven times its original length in the longitudinal direction and from about two to five times its original length in the lateral direction. The shaped article can be stretched before or after removal of residual solvent or concurrently with the removal of the solvent.

The solutions of this invention are also eminently suitable for the preparation of shaped articles of polyglycolic acid using dry spinning techniques. The solution concentrations which have been found suitable are the same as those discussed hereinabove for wet spinning. The temperatures at which the solutions are extruded are also the same as those discussed hereinabove for wet spinning. The extrudate emerges into a suitable gaseous inert medium which is usually a hot stream of a stripping gas such as, for example, air, nitrogen, or argon, which is maintained at a sufficiently high temperature to evaporate, from the spinning solution, the solvent associated therein with the polyglycolic acid. The temperature of the stripping gas is typically maintained at about 40° C. to 130° C., and preferably at 40° C. to 80° C. As the solvent is removed from the polymer, the polyglycolic acid forms a shaped article of polyglycolic acid which is thereupon stretched in accordance with the procedures described above for the wet spinning operation. Residual solvent can be removed from the polyglycolic acid by a variety of known techniques such as, for example, drying under vacuum.

The following examples are provided to further illustrate the invention.

EXAMPLE 1

Preparation of polyglycolic acid solutions

A variety of solutions of polyglycolic acid in both hexafluoroisopropyl alcohol and hexafluoroacetone sesquihydrate of various concentrations were prepared by admixing solvent and solute in the required portions and agitating the mixture at a prescribed temperature until solubility was achieved. The data shown below are illustrative of the polyglycolic acid solutions prepared.

| Solvent | Percent by wt.[1] | Temp. (° C.) | Hours[2] |
| --- | --- | --- | --- |
| Hexafluoroisopropyl alcohol | 19 | 55 | 3 |
| Hexafluoroacetone sesquihydrate | 19 | 55 | 2 |
| Hexafluoroisopropyl alcohol | 26 | 55 | 16 |
| Hexafluoroacetone sesquihydrate | 26 | 55 | 2 |
| Hexafluoroisopropyl alcohol | 30 | 65 | 24 |
| Hexafluoroacetone sesquihydrate | 35 | 65 | 3 |
| Do | 40 | 65 | 36 |

[1] Dissolved polyglycolic acid.
[2] Time required to achieve complete solution.

EXAMPLE 2

Dry spinning of polyglycolic acid

A spinning solution was prepared by dissolving 30 parts by weight of polyglycolic acid having an intrinsic viscosity of 1.2 in 70 parts by weight of hexafluoroisopropyl alcohol at 55° C. The solution was heated to 70° C. and pumped at the rate of 30 cc. per minute through a spinnerette having 16 capillaries 100 microns in diameter into a vertical column 20 cms. in diameter and 6 meters long. The upper portion of the column was maintained at 110° C. for a length of 4½ meters. The lower 150 cms. of the column was flushed with nitrogen at ambient temperature. A finish consisting of 10% mineral oil in xylene was applied and the yarn taken up at 300 meters/min. The yarn was found to contain 32.6% solvent which was removed in a vacuum oven at 35° C. overnight. The solvent-free yarn had a denier of 270.

This yarn was stretched in turbulent hot air at 80° C. to 3.5 to 5.5 times its original length, and heat-set at 135° C. for two hours to improve strength retention in living tissue when the yarn is used in the form of a braided surgical suture.

Similar results were obtained when the hexafluoroisopropyl alcohol was replaced with hexafluoroacetone sesquihydrate.

EXAMPLE 3

Wet-spinning of polyglycolic acid 30 parts by weight of polyglycolic acid were dissolved in 70 parts by weight of hexafluoroisopropyl alcohol at 50° C. The resulting spin dope was pumped at a rate of 27 cc./min. through a heater which warmed it to a temperature of 60° C., and then through a 20-hole spinnerette with 100 micron capillary diameters which was submerged in an ambient temperature water bath 2 meters in length. The coagulated wet gel was pulled away at a speed of 30 meters per minute and subjected to a countercurrent wash with tap water using 30 wraps on a pair of advancing rolls, the ends of which were elevated 20° above horizontal.

The washed gel was then led through a 60° C. water-bath and stretched to about 7 times its original length.

Free water was removed by sponges and aspirators as the stretched gel left the water bath. The gel was further dried, and stretched 3-fold, by drawing in 150° C. air to achieve a final denier of 195.

Similar results were obtained when the hexafluoroisopropyl alcohol was replaced with hexafluoroacetone sesquihydrate.

EXAMPLE 4

Casting of polyglycolic acid film

A solution of 25% polyglycolic acid (by weight) in hexafluoroacetone sesquihydrate was prepared by heating the mixture to 50° C. with stirring. The solution was poured onto a clean, smooth glass plate using a draw down blade to distribute the solution over the glass to a depth of about 5 microns. The solvent was allowed to evaporate and the resulting polyglycolic acid film was removed by peeling it off the glass.

The film produced was a tough, self-supporting clear film of polyglycolic acid. Similar results were obtained when hexafluoroacetone sesquihydrate was replaced with hexafluoroisopropyl alcohol.

EXAMPLE 5

Conversion of crystalline polyglycolic acid to amorphous polyglycolic acid

Five grams of polyglycolic acid which had been annealed at 175° C. for 24 hours was found to be insoluble in hexafluoroisopropyl alcohol even when heated to 60° C. This sample of polyglycolic possessed a degree of crystallinity greater than 40%. It was placed in a melt index unit, heated to 245° C. and extruded through a 30 mil orifice into liquid nitrogen by applying 20,000 p.s.i. to the piston of the unit. The substantially amorphous noodle was removed from the liquid nitrogen and allowed to warm up to room temperature in a vacuum dessicator. This treated polyglycolic acid was now readily soluble in 50 ml. of hexafluoroisopropyl alcohol at room temperature.

We claim:

1. A solution comprising polyglycolic acid having a crystalline melting point between about 222° C. and 235° C. and having a degree of crystallinity not greater than about 30% dissolved in hexafluoroisopropyl alcohol in an amount varying between 0.01% and 30% by weight of polyglycolic acid based on the total weight of the solution.

2. A solution comprising polyglycolic acid having a crystalline melting point between about 222° C. and 235° C. and having a degree of crystallinity not exceeding about 75% dissolved in hexafluoroacetone sesquihydrate in an amount varying between about 0.01% and 40% by weight of said polyglycolic acid based on the total weight of the solution.

References Cited

UNITED STATES PATENTS

| | | | |
|---|---|---|---|
| 3,047,524 | 7/1962 | Bowman | 260—78.3 X |
| 3,468,853 | 9/1969 | Schmitt et al. | 260—78.3 |
| 3,245,944 | 4/1966 | Middleton | 260—33.4 R |

LEWIS T. JACOBS, Primary Examiner

U.S. Cl. X.R.

260—33.4 R